(12) United States Patent
Furukawa et al.

(10) Patent No.: US 7,298,508 B2
(45) Date of Patent: Nov. 20, 2007

(54) DEVICE AND METHOD FOR USING MULTICAST TO TRANSMIT PRINT DATA TO NETWORKED PRINTERS

(75) Inventors: Akihiro Furukawa, Nagoya (JP);
Koshi Fukazawa, Nagoya (JP);
Kiyotaka Ohara, Nagoya (JP);
Masaaki Hibino, Yokkaichi (JP);
Hideki Nogawa, Nagoya (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 1179 days.

(21) Appl. No.: 09/818,868

(22) Filed: Mar. 28, 2001

(65) Prior Publication Data

US 2001/0046065 A1 Nov. 29, 2001

(30) Foreign Application Priority Data

Mar. 28, 2000 (JP) ............................. 2000-093029
Mar. 30, 2000 (JP) ............................. 2000-095109

(51) Int. Cl.
*G06F 3/12* (2006.01)
*G06K 15/00* (2006.01)

(52) U.S. Cl. ..................................... 358/1.15; 358/1.14
(58) Field of Classification Search ........ 358/1.1–1.18; 709/223, 224, 228, 229; 710/7, 8, 19
See application file for complete search history.

(56) References Cited

U.S. PATENT DOCUMENTS 6,449,054 B1 * 9/2002 Cox et al. ................... 358/1.15
6,584,096 B1 * 6/2003 Allan .......................... 370/352

FOREIGN PATENT DOCUMENTS

| JP | A 04-039722 | 2/1992 |
| JP | A 08-036474 | 2/1996 |
| JP | A 09-311768 | 12/1997 |
| JP | A 11-154062 | 6/1999 |

\* cited by examiner

*Primary Examiner*—Douglas Q. Tran
(74) *Attorney, Agent, or Firm*—Oliff & Berridge, PLC

(57) ABSTRACT

A printer control device includes a joining unit, a transmission unit, and a control unit. The joining unit causes at least one network printer to join a predetermined multicast address. The transmission unit converts print data into packets and multicast transmits the packets to the predetermined multicast address. The control unit monitors transmission/reception status of the packets at the at least one network printer that has joined the multicast address. Based on monitoring results the control unit controls transmission of packets to, waiting for packets from, and retransmission of packets to the predetermined multicast address.

35 Claims, 13 Drawing Sheets

FIG.3(a)

| IP ADRESS | NAME | LOCATION | SPEED | COPIES |
|---|---|---|---|---|
| 133.151.12.34 | PRINTER A | Bill's desk | 10ppm | 1 |
| 133.151.54.35 | PRINTER B | John's desk | 10ppm | 1 |
| 133.151.54.46 | PRINTER C | cpu room | 10ppm | 1 |
| 133.151.12.72 | PRINTER D | cpu room | 10ppm | 1 |
| 133.151.12.54 | PRINTER E | Tom's desk | 20ppm | 1 |

SELECT PRINTERS — OK

FIG.3(b)

| IP ADRESS | NAME | LOCATION | SPEED | COPIES |
|---|---|---|---|---|
| 133.151.12.34 | PRINTER A | Bill's desk | 10ppm | 1 |
| 133.151.54.35 | PRINTER B | John's desk | 10ppm | 1 |
| 133.151.54.46 | PRINTER C | cpu room | 10ppm | 1 |
| 133.151.12.72 | PRINTER D | cpu room | 10ppm | 1 |
| 133.151.12.54 | PRINTER E | Tom's desk | 20ppm | 2 |

SELECT PRINTERS — OK

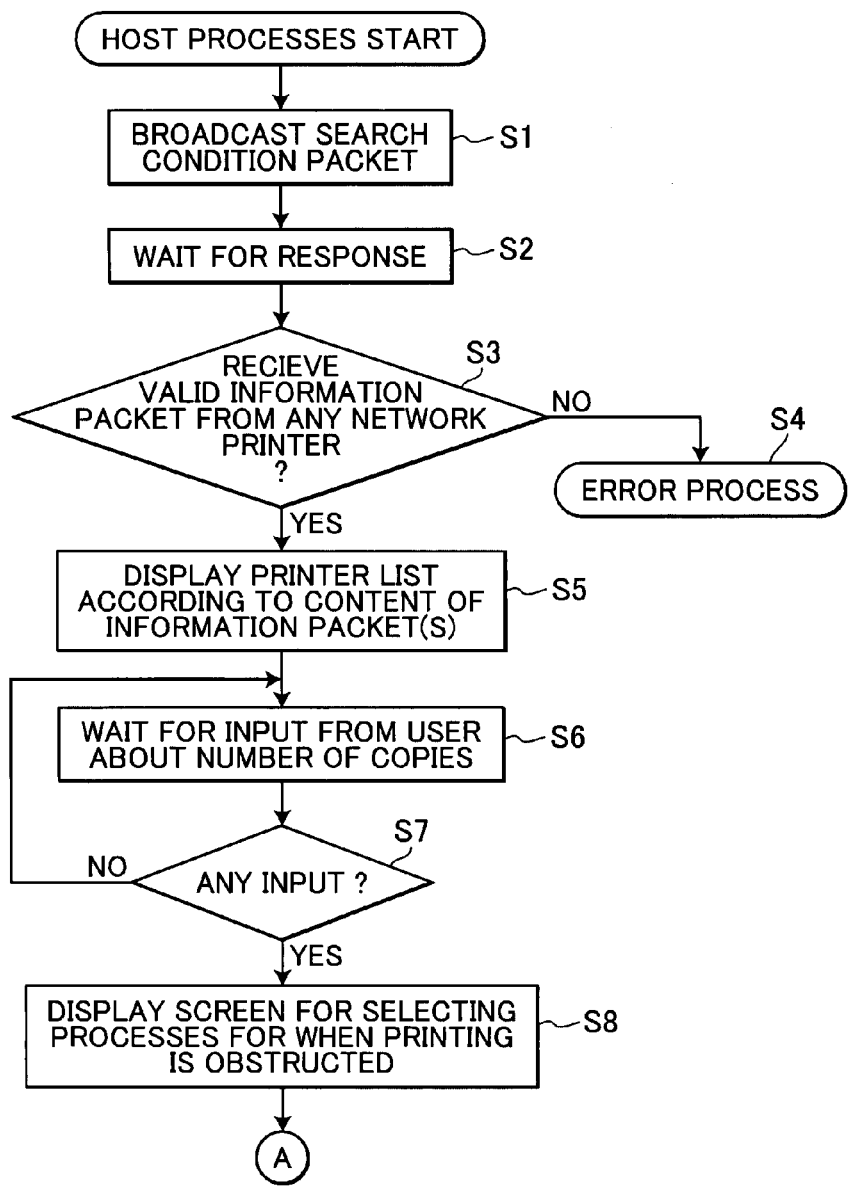

FIG.13

JOB PRINT INFORMATION MANAGEMENT BLOCK

| NUMBER OF RETRANSMISSIONS | 3 |
|---|---|

| FIRST RETRANSMISSION TIME | 3HRS 30MIN |
|---|---|
| SECOND RETRANSMISSION TIME | 4HRS 00MIN |
| THIRD RETRANSMISSION TIME | 24HRS 00MIN |

DEVICE AND METHOD FOR USING MULTICAST TO TRANSMIT PRINT DATA TO NETWORKED PRINTERS

BACKGROUND OF THE INVENTION

1. Field of the Invention

The present invention relates to a printer control device and printer control method capable of multicast transmission in a network environment, and a network printer that uses the printer control device and the printer control method. The present invention further relates to a device and method for controlling replacement or supplementary printing when a printer becomes unable to print.

2. Description of the Related Art

Conventionally, the following two methods have been used by a single host computer to print a plurality of copies at printers connected to the host computer by a network.

In a first method, the host computer indicates the required number of copies to a single one of the network printers and the sends the print data to only that network printer.

In a second method, the host computer transmits the same print data sequentially to a plurality of the network printers and has each network printer print out one or more copies.

However, the first method can take a long time to print all the desired copies if the single network printer has a slow printing speed.

The second method can take a long time to complete printing all of the copies because the host computer must send out the same print data separately to each of the responsible network printers. Further, redundant sets of the same print data are transmitted across the network, thereby increasing the amount of traffic on the network and impeding other processes performed under the network environment.

With either of these methods, there will be times when transmission interference or some other reason renders printing on a network printer impossible. There has been known a method of substitute printing for such situations, wherein a different printer on the network is used as a substitute to print out remaining pages.

SUMMARY OF THE INVENTION

However, it is impossible to perform substitute printing using this conventional method when none of the other network printers is available to perform the substitute printing.

Also, the remaining pages cannot be printed out using a substitute network printer, if the substitute network printer is not the same model or type. There are various reasons for this, such as the print settings including print font and sheet size being different.

It is an objective of the present invention to overcome the above-described problems and provide a print control device and a printing control method capable of performing print processes simultaneously in a parallel manner using a plurality of network printers connected together in a network environment, reducing the printing time, limiting increases in the amount of traffic across the network, and reliably performing replacement or supplementary printing of documents that for some reason have become impossible to continue printing out. It is a further objective to provide a network printer that uses the print control device or the print control method.

In order to achieve the above-described objectives, a printer control device according to the present invention includes a joining unit that causes at least one network printer to join a predetermined multicast address; a transmission unit that converts print data into packets and multicast transmits the packets to the predetermined multicast address; and a control unit that monitors transmission/reception status of the packets at the at least one network printer that has joined the multicast address and that, based on monitoring results, controls transmission of packets to, waiting for packets from, and retransmission of packets to the predetermined multicast address.

According to another aspect of the present invention a network printer includes a network interface connected to a network; and a multicast joining unit that joins a multicast address.

According to still another aspect of the present invention a print control method causes at least one network printer to join a multicast address; transmits a packet of print data to the multicast address; monitors transmission/reception status of packets at the at least one network printer that joined the multicast address; and controls transmission of packets, waiting for packets, and retransmission of packets with respect to the multicast address according to monitoring results.

BRIEF DESCRIPTION OF THE DRAWINGS

The above and other objects, features and advantages of the invention will become more apparent from reading the following description of the embodiment taken in connection with the accompanying drawings in which;

FIG. 3 is a schematic view showing a select printers screen displayed on the display of the host computer;

FIG. 6 (*b*) is a schematic view showing one of the printers requesting the host computer to resend a packet with sequence number 2;

FIG. 6 (*c*) is a schematic view showing the printer of FIG. 6 (*b*) properly receiving the resent packet with sequence number 2;

FIG. 6 (*d*) is a schematic view showing one of the printers not responding in any way after the host computer transmits a packet with sequence number 3;

FIG. 6 (*e*) is a schematic view showing the host computer resending the packet with sequence number 3 after a time period elapses and receiving acknowledgement of receipt from the previously non-responding printer;

FIG. 8 is a flowchart representing processes performed in the host computer;

FIG. 13 is a schematic view showing a job print information management block screen displayed on the display of the host computer;

DETAILED DESCRIPTION OF THE EMBODIMENT

A print system according to an embodiment of the present invention will be described while referring to the attached drawings.

Figure 1:
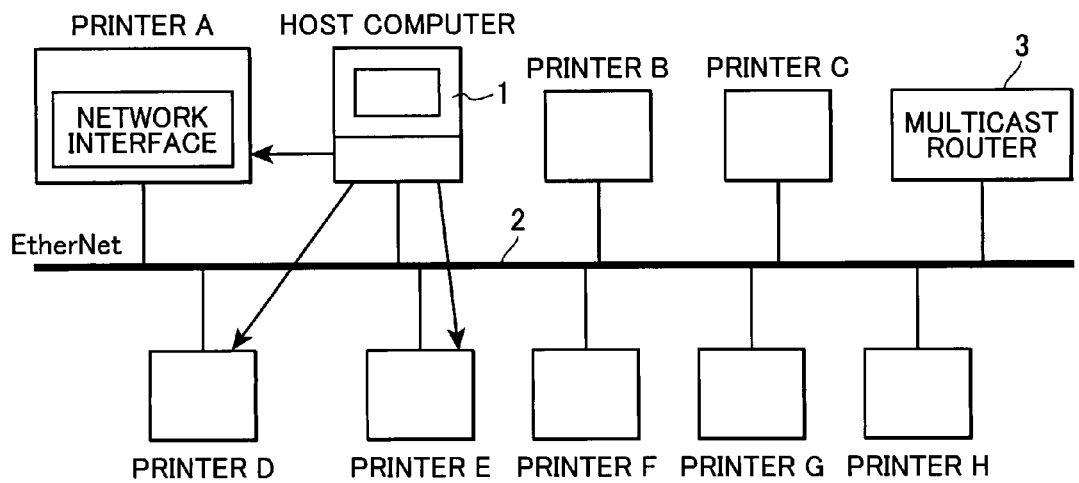
FIG. 1 is a block diagram showing a print system according to an embodiment of the present invention.

As shown in FIG. 1, the printing system according to the present embodiment includes a host computer 1, a multicast router 3, and printers A to H, all connected to a network 2, such as a bus. The host computer 1 and the network printers A to E are connected to each other through the network 2.

According to the present embodiment, Transmission Control Protocol/Internet Protocol (TCP/IP) is used as the transmission protocol. However other protocols that enable multicast can be used instead.

The particular TCP/IP used in the present embodiment is Internet Protocol (IP) Multicast using User Datagram Protocol (UDP). Unicast and broadcast transmission are also possible.

The host computer 1 is installed with application programs that enable multicast transmission of print data to the network printers and commanding each network printer to print based on the print data.

The host computer 1 functions to transmit print data over a local area network (LAN) with a broadcast address or a particular multicast address as the target address. The print data could be generated by the host computer 1 itself or received by the host computer 1 from another device.

The host computer 1 also functions to detect which network printers on the network are capable of printing the subject print data without any problems. That is, before the host computer 1 transmits the same print data simultaneously to a plurality of network printers using multicast transmission, the host computer 1 must determine which network printers are capable of reliably printing out the print data. For example, network printers that only understand PostScript (trademark) cannot reliably print out print data in Printer Control Language (PCL), so the same print data cannot be transmitted to network printers that only understand PostScript (trademark) and also to network computers that only understand PCL. Also, even if all of the network printers have the same capabilities, the host computer 1 needs to investigate the present situation of the printers, because some may not be immediately usable, for example because they are presently offline.

The host computer 1 searches for capable network printers based on the following search conditions:

(a) whether a network printer supports the printing function of the printing system;

(b) whether the printer can print on the appropriate sheet size, for example on LETTER size sheets;

(c) whether the printer can print out the required number of pages, for example 50 sheets;

(d) whether the printer can print in the required orientation portrait, that is, the vertical and horizontal directions;

(e) whether the printer can print in the required resolution, for example 600 dpi;

(f) whether the printer includes a Page Description Language (PDL) and, if so, what version, for example PCL5;

(g) whether the printer can print in monochrome only or also in color, for example, for color printing; and (h) what the present status of the printer is, for example, is the printer able to print immediately.

The host computer 1 can determine which network printers match the search conditions by asking the network printers directly by broadcasting over the network using Simple Network Management Protocol (SNMP) or an independent protocol. Alternatively, the capabilities of each network printer can be registered in a directory service, which the host computer 1 uses to search for network printers that meet the conditions. Example directory services include CCITT X.500 Series of Recommendations, Service Location Protocol (SLP), and Lightweight Directory Access Protocol (LDAP). The directory service can be generated either spontaneously by the network printers or by input from the manager of the network. The host computer 1 obtains the IP address of the network printers, the network printer names, information on the set up location of the network printer, and the like as the result of the search.

Also, the host computer 1 functions to select network printers to be actually used for printing from the network printers that are determined to meet the search conditions.

That is, the print data is not sent to all network printers on the network that are capable of printing the print data. As shown in FIG. 3 (b), the host computer 1 displays a network printer list showing the physical location, IP address, and network printer name for each network printer determined to meet the search conditions. The user can select network printers from the list to use for the actual printing. The user can make his or her selection based on how many copies are to be printed, which network printers are physically closer to the user, and which network printers have a higher printing speed.

The host computer 1 functions to set the number of copies to be printed independently for each selected network printer. For example, when the selected network printers have printing speeds of either 10 or 20 pages per minute (ppm), this means that the network printers with the print speed of 20 ppm can print twice as fast as the network printers with the print speed of 10 ppm. If all of the network printers are controlled to print a single copy each of print data, then the user will have to wait for the 10-ppm printers to finish printing after the 20-ppm printers have completed printing out their copies. Printing processes can be performed efficiently if the 20-ppm network printers are set to print twice as many copies as the 10-ppm network printers. The host computer 1 searches the capability of the network printers designated by the user to perform a certain printing task and automatically assigns each of the designated network printers with the optimum number of copies based on the printing speeds in order to reduce the amount of waiting time to a minimum. In the above-described example, if the user designates three of the 10-ppm network printers and one of the 20-ppm network printers to print five copes of the same print data, the host computer 1 automatically assigns the 20-ppm network printer to print two copies and the three 10-ppm network printers to print a single copy each. As a result, the network printers will all finish their printing tasks at the same time. The settings for the number of copies to be printed by each network printer is sent to the network printers in commands unicast transmitted before the print data is multicast transmitted.

The host computer 1 also functions to set what operations the host computer will perform when a problem that prevents the network printer from receiving print data occurs at a network printer. There are a variety of problems that can prevent a printer from receiving print data. Some examples are a paper jams, running out of paper, and running out of toner.

The host computer 1 divides print data into packets and transmits the packets to a multicast address, so that the same print data is simultaneously transmitted to all network printers that belong to the multicast group associated with the multicast address. The host computer 1 also multicast transmits a variety of commands to the network printers via the multicast address.

Those of the network printers A to E that are members of the multicast group receive the print data packets and advise the host computer 1 when packets are properly received. The host computer 1 constantly monitors whether network printers are receiving packets and transmits packets accordingly. The network printers subject the print data packets to predetermined processes and output them as print documents. When a problem occurs at a network printer, then processes appropriate to the problem are performed. A desired print job can be executed using this series of processes.

For exemplary purposes, assume that the same print data is to be printed simultaneously at the three network printers A, B, and C and the print data is divided into a total of 20 packets. Assume also that about the time when the tenth packet is transmitted to the network printers A, B, and C, a data-reception impeding problem occurs at the network printer B, for example, the network printer B runs out of paper, so that the network printer B can receive no further data. As a result, although the network printers A and C return an acknowledgement response to the host computer host computer 1 to acknowledge proper receipt of the tenth packet, the network printer B either returns a negative response to clearly inform the host computer 1 that it could not receive the tenth packet, or merely does not return a positive response until the data-reception impeding problem is solved. Because the host computer 1 will not be able to transmit the next data packet, the network printers A and C must wait until the data-reception impeding problem of the network printer B is solved. The host computer 1 includes a function that enables the user to select what action the host computer 1 takes in such a situation. The following two modes are available.

In the first mode, the host computer 1 waits indefinitely until all of the network printers are able to receive more print data. The user selects the first mode when it is absolutely necessary to print all copies using a single print command. When this mode is selected, the user must quickly take care of data-reception impeding problems at the network printers.

In the second mode, the host computer 1 waits for a preset fixed duration of time for all the network printers to recover. The user selects the second mode when it is desired to give up on the reception-impeded network printers and continue printing with only the properly operating network printers. When in the second mode, the host computer 1 waits a time T1 to receive an acknowledgement response (ACK) about whether printers have received a transmitted packet. If no acknowledgement response is received by the time T1 elapses, for example, because of a data-reception impeding problem at a network printer, then the host computer 1 gives up on trying to print with that network printer and transmits the next packet for the benefit of the other printers. The time T1 can be either set by the user or set to a default value by the host computer 1. When a network printer that did not return an acknowledgement response to the host computer 1 receives the next packet, the printer understands that the host computer 1 has given up on it, and so discards any further packets and no longer prints. In this case, the host computer 1 functions to resend print data each waiting time T1.

It should be noted that there are certain types of data-reception impeding problems that cannot be corrected immediately. Because of such problems, it is desirable that the host computer 1 be capable of switching from the first mode to the second mode, so that, with respect to the above-described example, the host computer 1 is capable of giving up on printing using the network printer B, and just continue printing operations using the network printers A and C, even if the first mode is the presently selected mode.

The host computer 1 functions to induce all selected network printers to join a particular multitask group.

It is desirable that the network printers be capable of receiving multicasted data only when necessary. According to the present embodiment, even after a network printer is set to be capable of receiving print data from a particular multicast address, the printer is also capable of judging whether to print out the print data or discard print data based on a command sent in the print data. However, with this configuration, it is possible that the network printers ability to properly perform other printing work from the host computer 1 will be hindered. That is, when a network printer judges not to print out further print data from the host computer 1, the network printer must perform operations to determine that received print data is unnecessary and to discard the print data. These operations become overhead that might hinder other print work.

In order to put the selected network printers into a condition capable of receiving all multicast, the host computer 1 unicast transmits a command to each network printer, ordering the network printers to join the multicast group used for printing.

Further, the host computer 1 functions to automatically resend print data when it does not receive an acknowledgement response from a network printer even after a predetermined waiting time T2 elapses.

The host computer 1 divides the print data into packets and transmits the packets to the multicast address. The transmitted packets are received by all of the network printers that are members of the multicast group. Sequence numbers are appended to the packets. Basically, once the host computer 1 transmits a packet with a particular sequence number, it cannot transmit the packet with the next sequence number until an acknowledgement response is received from all the network printers for the packet with the particular sequence number.

There is a possibility that packets will be lost because of some sort of problem generated during transmission using the network. Two cases are conceivable. That is, either all or a portion of the print data transmitted from the host computer 1 is not properly received by the network printers, or all or a portion of acknowledgement responses transmitted from the network printers are not properly received by the host computer 1. Both of these situations can be taken care of by the host computer 1 resending the print data with the same sequence number. The host computer 1 can be set with prescribed values for how many times a packet is resent and for duration of a waiting time T2 before a packet is resent. However, even if such values are prescribed, a setting function can be provided to enable the user to set values himself or herself.

It should be noted that when the host computer 1 is set in the second mode, the host computer 1 gives up on printing using network printers that do not return acknowledgement responses, even though the fixed waiting time T1 has elapsed. In this case the host computer 1 proceeds to transmit subsequent packets.

The network printers A to E are installed with executable control programs capable of responding to transmission requests from the host computer 1. The network printers A to E function in the following manner by execution of these control programs.

The network printers A to E function to receive print data transmitted to a broadcast address or to a particular multicast address.

The network printers A to E function to refuse any new commands from the host computer 1 to join a multicast group when already a member of another multicast group.

Of the network printers that receive a join group command to join a multicast group, those network printers capable of responding make preparations, such as setting internal settings, that enable reception of data from the multicast address associated with the commanded multicast group. Once the network printers are in a condition capable of receiving data, the network printers transmit a response to the host computer to advise this to the host computer 1. It should be noted that when a network printer is already a member of the multicast group, the network printer sends a response to the host computer 1 that refuses the join group command.

Each of the network printers A to E function to advise the host computer 1 that it properly received a print data packet, to advise that it is incapable of receiving no further data, and to request the host computer 1 to resend certain print data.

Each of the network printers A to E sends an acknowledgement response to the host computer 1 when it properly receives print data with a sequence number. However, when a network printer is in a condition that prevents it from receiving any further print data, for example when the network printer's reception buffer is full or when the network printer is out of paper, then the network printer does not send an acknowledgement response. In such a situation, the network printer can send a negative acknowledgement response (NACK) to the host computer 1, clearly indicating that no further reception is possible. The network printer appends the reason for the negative acknowledgement response to the negative acknowledgement response. The host computer 1 advises the user about the reason that printing was stopped. Assume that the network printers A, D, and E recognize that for some reason they have received a defective packet. In this case, the corresponding network printers A, D, and E each send a positive resend request to the host computer 1, so that the host computer 1 can quickly perform processes to resend the packet without waiting the waiting time T2.

The network printers A to E function to leave the particular multicast group that was designated by the command from the host computer 1.

The host computer 1 sends a command to indicate that a network printer should leave the particular multicast group, individually by unicast transmission to the relevant printers in the particular multicast group. The network printers leave the multicast group upon receipt of such a command.

Figure 9:
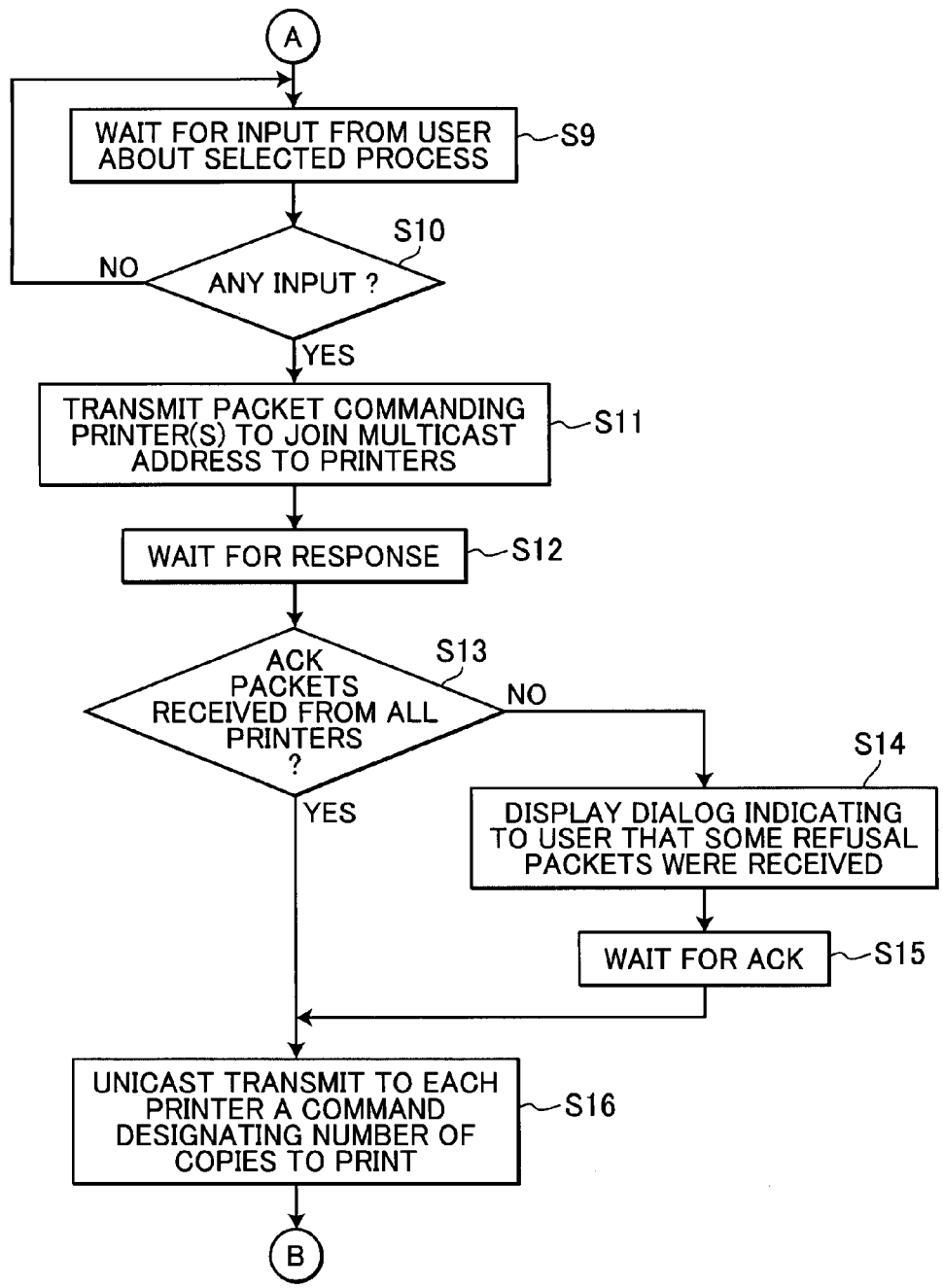
FIG. 9 is a flowchart representing further processes performed in the host computer.
Figure 10:
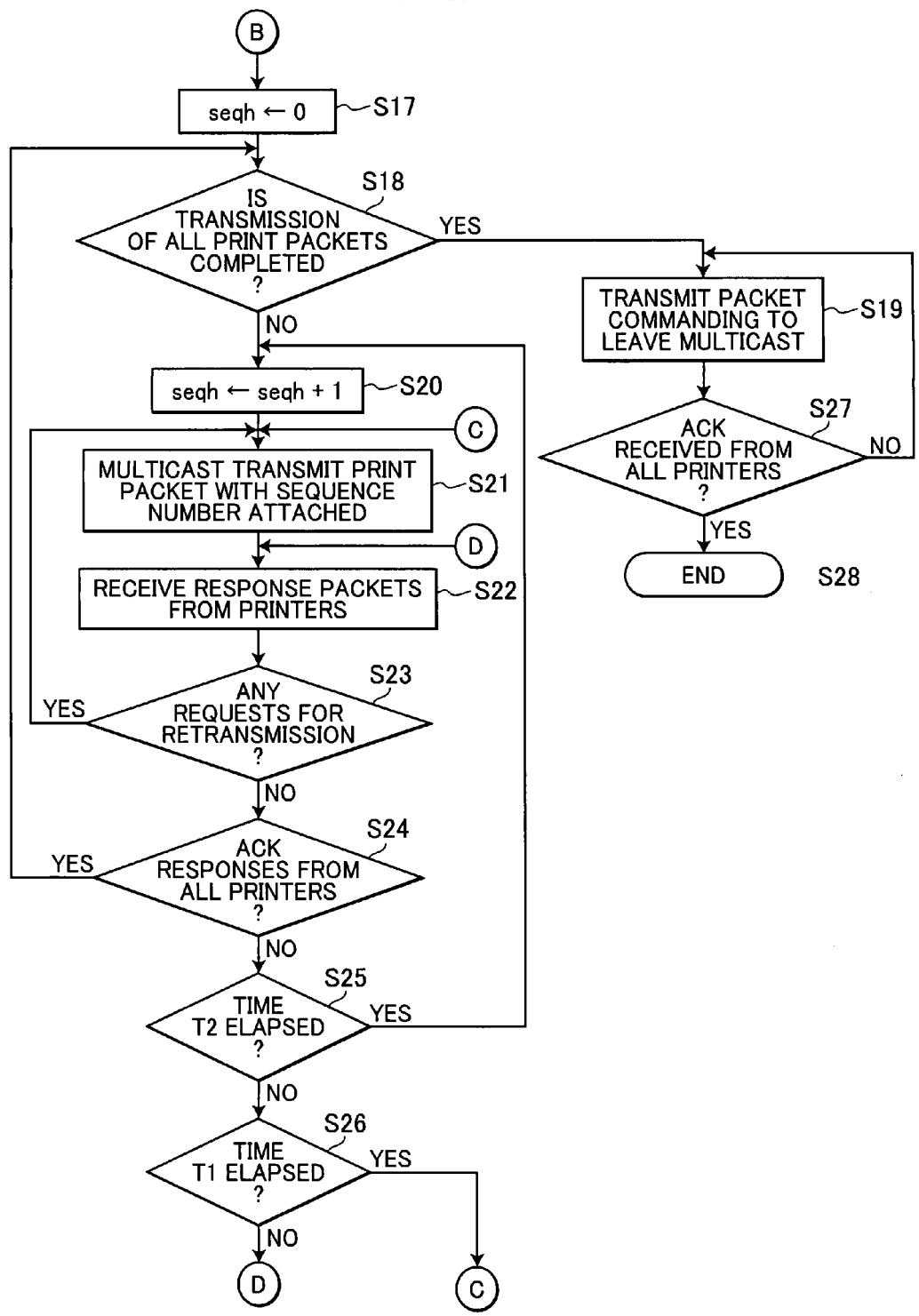
FIG. 10 is a flowchart representing still further processes performed in the host computer.
Figure 11:
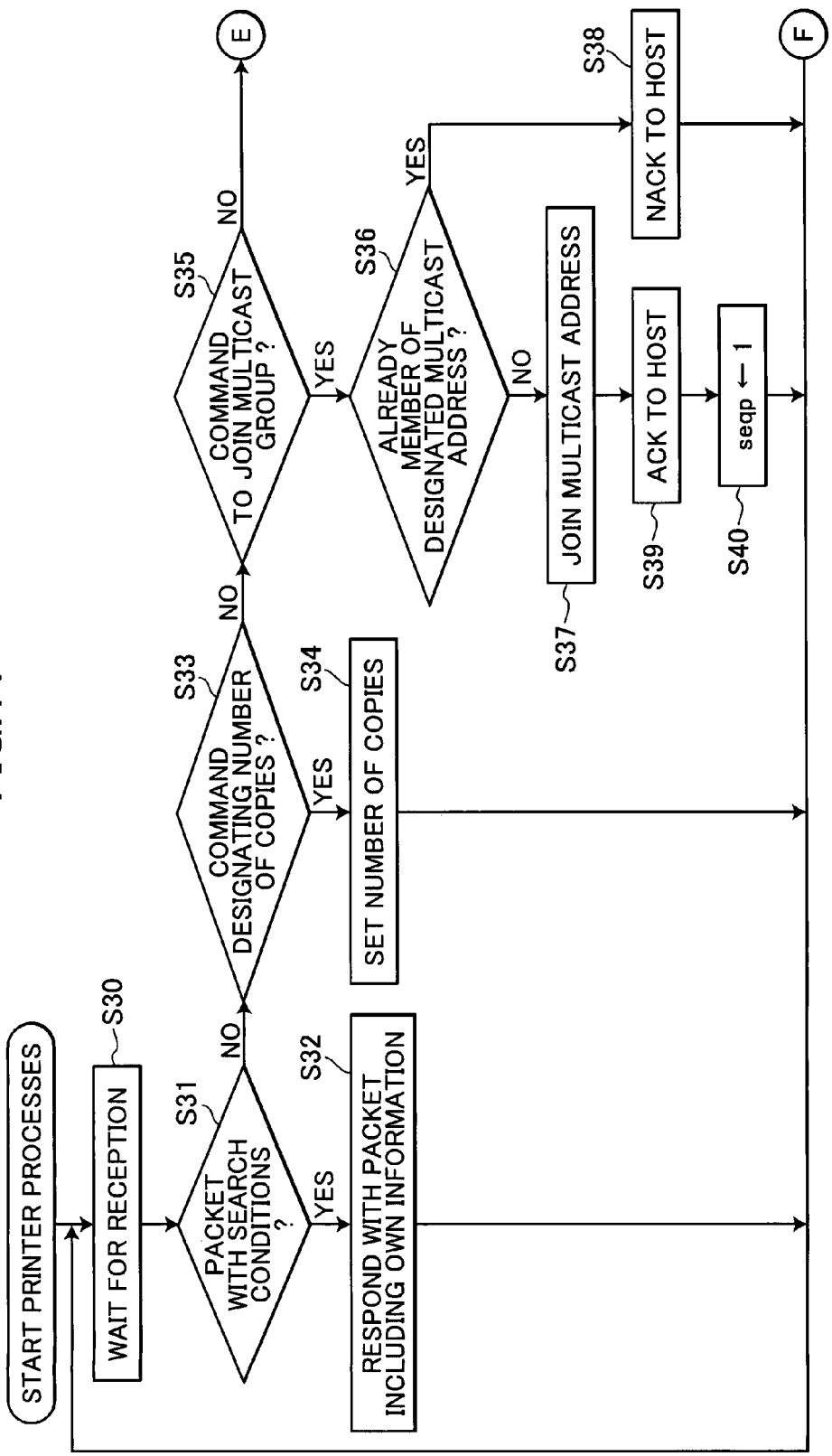
FIG. 11 is a flowchart representing processes performed in each of the network printers.
Figure 12:
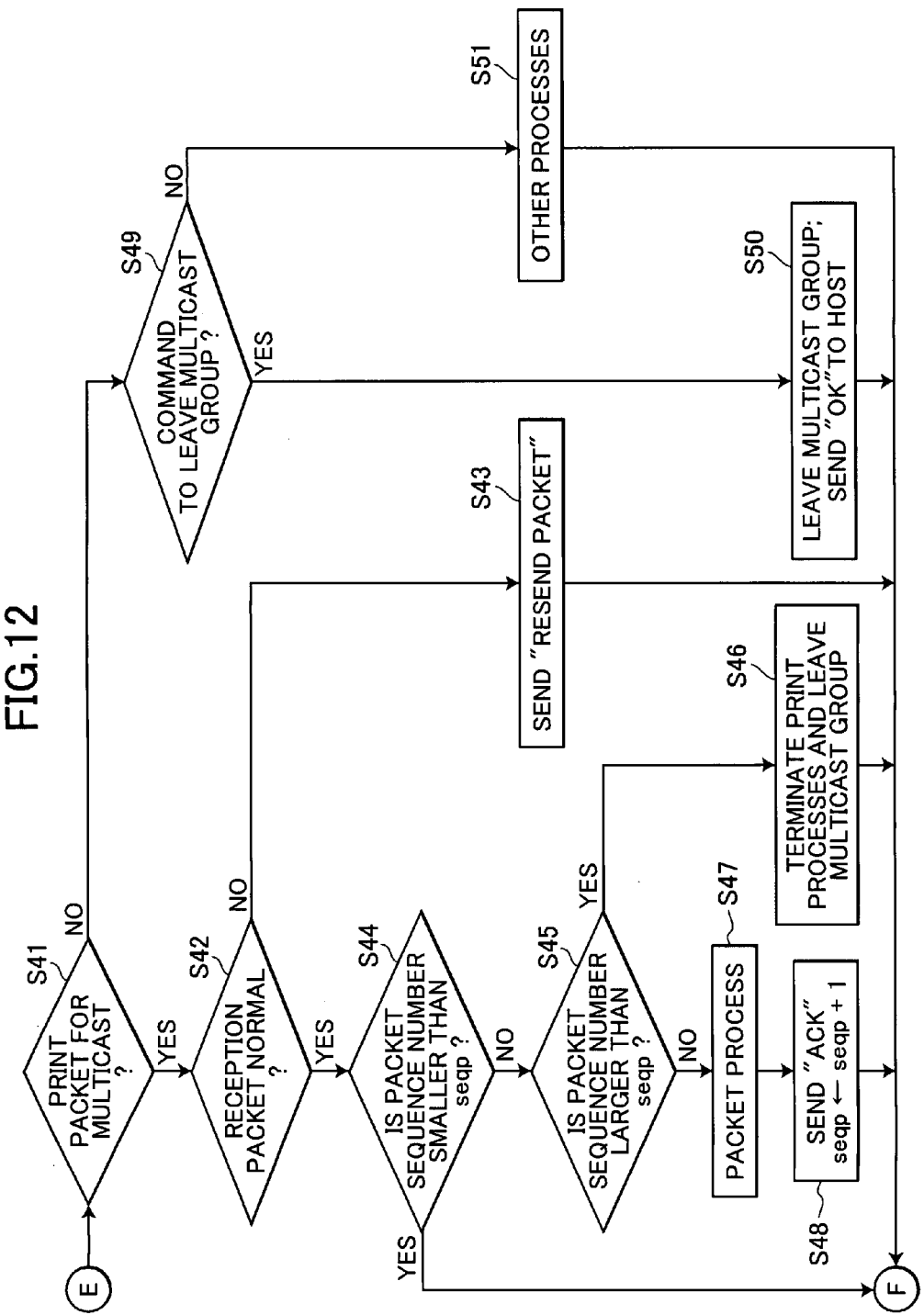
FIG. 12 is a flowchart representing further processes performed in each of the network printers.

Next, while referring to the flowcharts of FIGS. 8 to 12, an explanation will be provided for processes performed by the host computer 1 and the network printers A to H to print based on print data. The flowcharts of FIGS. 8 to 10 represent processes performed in the host computer 1 and the flowcharts of FIGS. 11 and 12 represent processes performed in the network printers.

First, the host computer 1 searches over the network for network printers that are capable of printing the target print data without problem. To do this, the host computer 1 broadcasts a search condition packet to all the network printers (S1) and waits for responses (S2). The search condition packet includes a command and a set of search conditions. The command commands any network printer that meets the search conditions to respond positively to the host computer 1. The search conditions designates the following characteristics for printers:

(a) support for the print function of the printing system of the present embodiment;

(b) capability of printing LETTER size sheets;

(c) capability of printing 50 pages;

(d) orientation portrait of portrait;

(e) support for a resolution of 600 dpi;

(f) PDL of PCL5;

(g) capability of printing in color; and (h) "ready" printer status.

Figure 2:
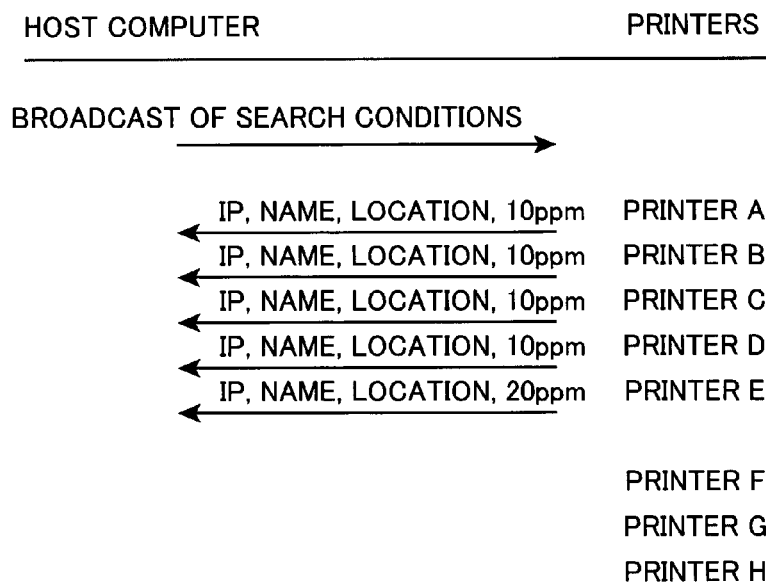
FIG. 2 is a schematic view showing communication between a host computer and network printers of the system of FIG. 1 when the host computer broadcasts search conditions.

At this time, the network printers are waiting for reception of incoming transmissions (S30). When the network printers receive a broadcasted request (S31:YES), then each network printer checks to see if it meets the search conditions indicated in the packet. Those network printers that match the search conditions send a packet with it own information to the host computer 1 (S32). In the example of FIG. 2, five of the eight network printers, that is, network printers A to E, meet the search conditions in the packet and so send an information packet to the host computer 1.

When the host computer 1 receives a valid information packet as a response from a network printer (S3:YES), then the host computer 1 stores the information in the packet in an information list and displays the information list (S5). FIG. 3 (a) shows an example of a list 10 with information transmitted from the network printers A to E. On the other hand, if the host computer 1 receives no valid information packet (S3:NO), then the host computer 1 performs predetermined error processes (S4).

The host computer 1 waits for the user to input the number of copies he or she wishes to print out at each printer (S6). Before inputting the number of copies, the user analyses the various displayed information, such as location and speed of the printers, in the information list 10 and selects which of the printers A to E that he or she desires to use for actual printing. In the example of FIG. 3 (b), the user has selected the three printers A, D, and E. As shown in FIG. 3 (b), the listings for selected printers are displayed in a manner that distinguishes them from those of non-selected printers. In the example of FIG. 3 (b), the listing for selected printers is displayed superimposed with hashing.

The user then inputs the number of copies he or she wishes each printer to print. In this example, the printer E has twice the printing speed of the other two selected printers A and D, so the user inputs that the printer A and D should print one copy each and the printer E should print twice that, or two copies. It should be noted that the host computer can automatically assign the optimum number of copies based on the printing speeds in order to reduce the amount of waiting time to a minimum as described above.

Once the settings have been input, then the user presses the ENTER key of the keyboard or uses a mouse (not shown) to click on the "OK" button 11 of the information list 10.

Figure 4:
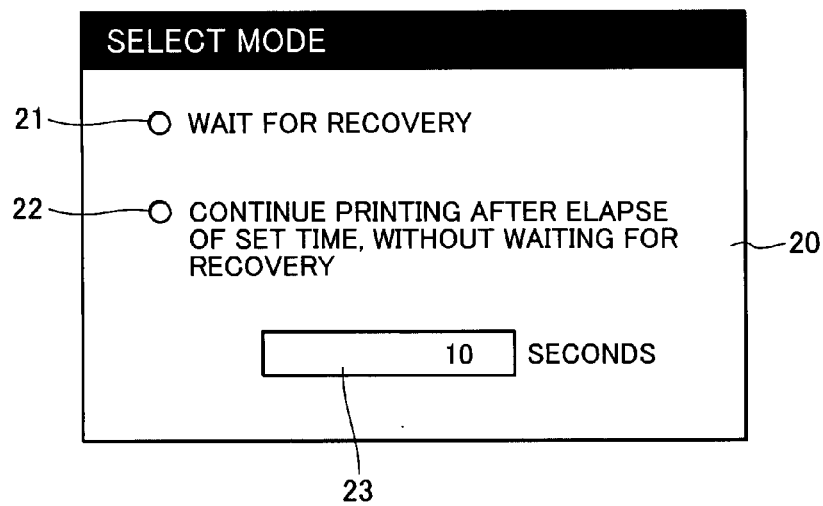
FIG. 4 is a schematic view showing the select printers screen of FIG. 3, with printers that fill the search conditions displayed in a distinguishable manner.

When the host computer 1 detects such input as the OK button being clicked (S7:YES), then a selection screen 20 shown in FIG. 4 is displayed to enable the user to select what action the host computer is to take when printing processes are impeded in some way (S8) and the host computer waits for the user's input (S9).

The user uses the selection screen 20 to designate what action, if any, the host computer 1 should take when a problem occurs at a printer that is presently printing, so that the printer can no longer receive print data transmitted from the host computer 1. The selection screen 20 includes buttons 21 and 22. When the user selects button 21, then the host computer 1 will wait indefinitely until the problem with the printer is resolved. When the user selects button 22, then the host computer 1 will wait for a set duration of time, and then continue printing operations using the other printers, regardless of whether the problem at the one printer is resolved. The user clicks on one of the buttons and a check mark will appear in the clicked button. When the user selects the button 22, then a text box 23 of the selection screen 20 becomes active so the user can input a desired waiting time. In the example of FIG. 4, the user input 10 seconds waiting time in the text box 23.

Figure 5:
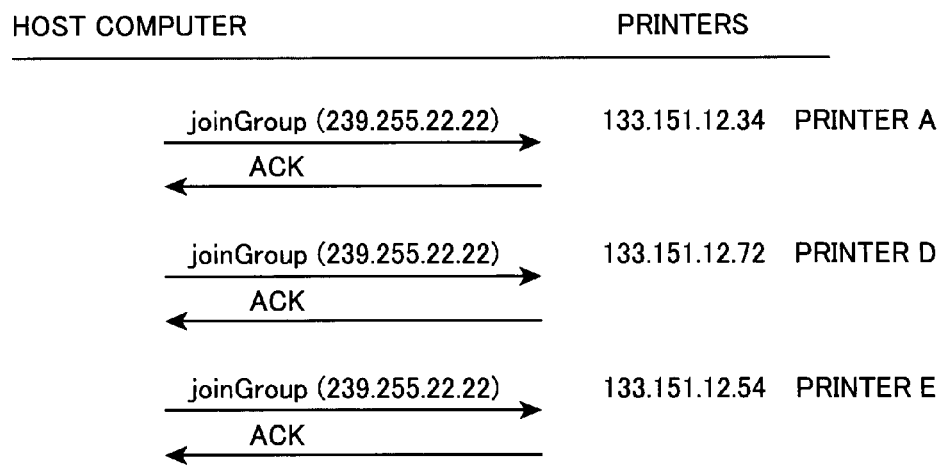
FIG. 5 is a schematic view showing the host computer commanding the printers that meet the search conditions to join a multicast group and the printers responding affirmatively.
Figure 6A:
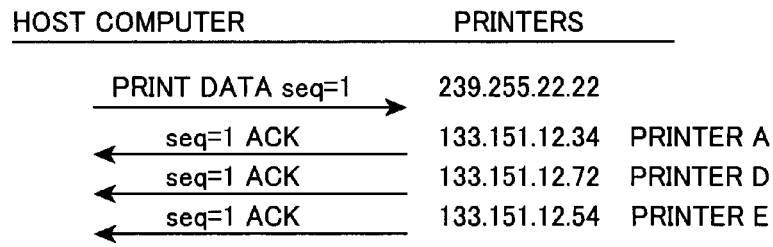
FIG. 6 (*a*) is a schematic view showing the host computer transmitting a packet with sequence number 1 to the multicast address associated with the multicast group, whereupon the printers that are members of the group receive the packet and respond accordingly.
Figure 6B:
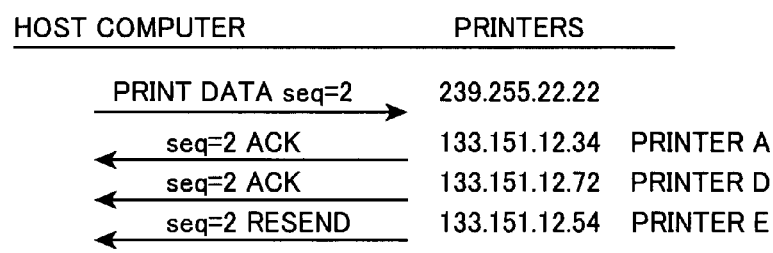
Figure 6C:
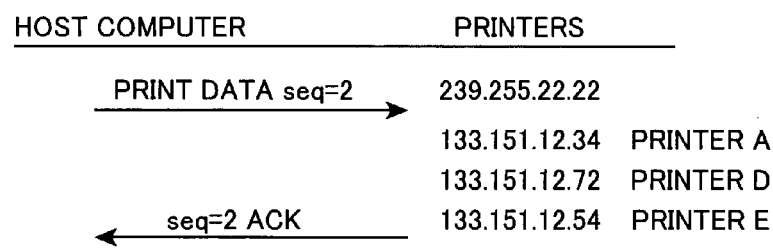
Figure 6D:
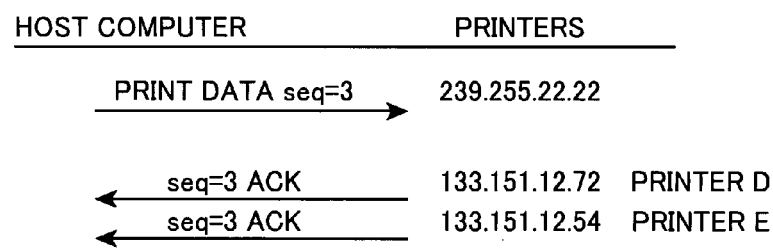
Figure 6E:
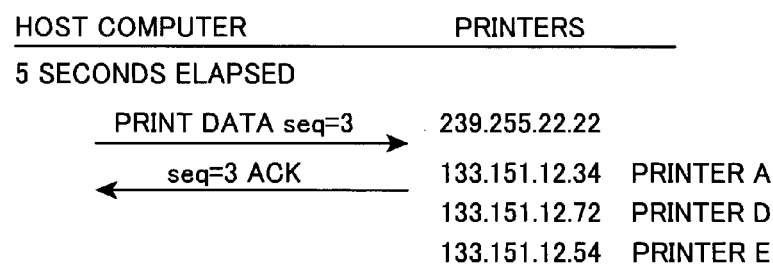
Figure 7A:
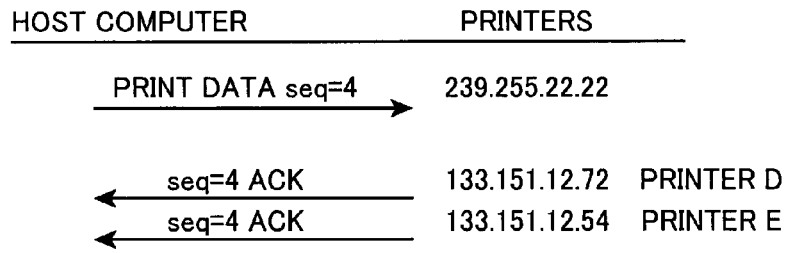
FIG. 7 (*a*) is a schematic view showing one of the printers not responding in any way after the host computer transmits a packet with sequence number 4.
FIG. 7(b) is a schematic view showing the host computer retransmitting the packet with sequence number 4 after a time period elapses.
FIG. 7(c) is a schematic view showing the host computer, upon still receiving no response from the one printer, sending the packet with sequence number 5 to the multicast address and receiving acknowledgement of receipt from the other printers.
FIG. 7(d) is a schematic view showing the host computer unicasting a leave group command to the printers when printing operations are completed.
Figure 7B:
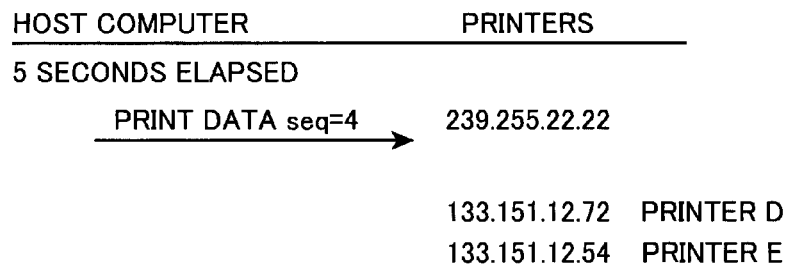
Figure 7C:
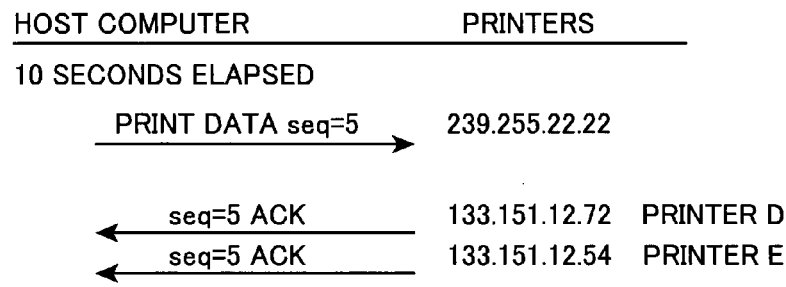
Figure 7D:
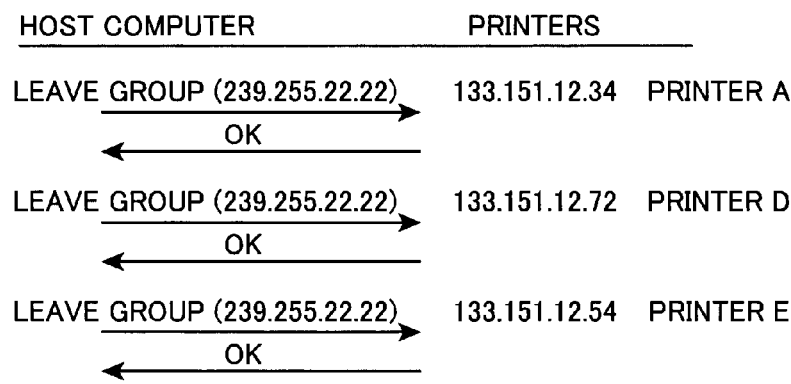

When the host computer 1 detects that such input has been made (S10:YES), then the host computer 1 unicast transmits a command to the selected printers (S11) and waits for responses from the printers for a predetermined duration of time, for example, two seconds (S9). The command commands the printers to join a particular multicast address. In the example of FIG. 5, the host computer 1 unicast transmits a "joinGroup" command to the printers A, D, and E, requesting the printers to join the multicast address (239.245.22.22).

When the printers A, D, and E receive the command (S35:YES), then each determines whether or not they are already a member of the designated multicast address (S36). When not already a member (S36:NO), then the printer joins the multicast group associated with the multicast address (S37) and sends an acknowledgement signal to the host computer 1 to indicate that the printer has completed processes for joining the multicast address (S39).

In order to join the multicast group, the network printer sets its settings so that it is capable of transmitting and receiving messages having a multicast address used by the multicast group that the network printer is to join. Also, the network printer sends a special packet called Internet Group Management protocol (IGMP) over the network 2 to the multicast router 3, indicating to the router 3 that the network printer, which is under management of the router 3, is to transmit packets to and receive packets from the particular multicast address. Then the printer enters the sequence number 1 into a sequence number register seqP maintained by each of the printers (S40). In the example shown in FIG. 5, all of the selected printers A, D, and E perform processes to enable reception of packets from the multicast address and send an acknowledgement signal to the host computer 1.

However, when a printer is already a member of the multicast address (S36:YES), then the printer transmits a negative acknowledgement packet to the host computer 1, indicating that the printer refuses to participate (S38).

When the host computer 1 receives a response from each printer, it determines whether all of the responses are acknowledgement packets (S13). If not, that is, if any of the responses are a negative acknowledgement packet (S13: NO), then the host computer 1 displays a dialog indicating that a portion of the printers returned negative acknowledgement packets (S14) and waits for the user to click on or press the OK button of the dialog (S15).

However, if the host computer 1 receives an acknowledgement packet from all of the printers (S13:YES), then the host computer 1 unicast transmits a command to each of the selected printers (S16). The command indicates the number of copies that each printer is to print out.

When a printer receives the command that indicates the number of copies to print out (S33:YES), then the printer performs internal setting operations to indicate the number of copies it is to print out (S34).

The host computer 1 divides the print data into packets and enters the sequence number 0 into a packet sequence register seqh managed by the host computer 1 (S17). Then, the host computer 1 judges whether all packets of the print data have been transmitted (S18). If not (S18 NO), then the host computer 1 increments the value in the sequence number register seqh by one (S20) and multicast transmits the print data packet with the attached with the sequence number indicated by the sequence number register seqh, that is, one in this example (S21). Also, the host computer 1 starts counting the waiting times T1 and T2 simultaneously with this transmission. Then the host computer 1 waits for a response packet from the printers (S22). In the example shown in FIG. 6 (a), the host computer 1 multicast transmits a packet of print data with a sequence number 1, that is, the value in the sequence number register seqh, to the multicast address (239.245.22.22).

When a printer receives the multicast print packet (S41: YES), it judges whether the packet is normal or not (S42). If normal (S42:YES), then the printer judges whether the value of the sequence nuiber attached to the packet is smaller than the value in the register seqp (S44). If so (S44:YES), then the received packet is not one that needs to be processed right now, so the printer ignores the packet. However, if the sequence number of the packet is larger than the value in the register seqp (S44:NO), then the printer judges whether the value of the sequence number attached to the packet is larger than the value in the register seqp (S45). If not (S45:NO), then the printer processes the received packet (S47). During these processes, the printer stores and develops the print data in a memory of the printer and executes print operations based on the developed print data. After completing the processes on the packet, the printer sends an acknowledgment response (ACK) to the host computer and also increments the value in the register seqp by one (S48). In the example of FIG. 6 (a), each of the printers A, D, and E send an acknowledgement response (ACK) to the host computer. In the present example, all of the printers return an ACK signal within five seconds.

Once the host computer 1 receives response packets from all of the printers, the host computer 1 confirms whether any of the response packets are requests for retransmission (S23). If not (S23:NO), then the host computer 1 judges whether acknowledgement responses were received from all of the printers. If so (S24:YES) the transmission processes are continued. That is, the host computer 1 confirms whether all packets have been transmitted (S18) and, if not (S18: NO), increments the value in the register seqh by one (S20) and transmits the packet with the next sequence number (S21).

In the example shown in FIG. 6 (b), the host computer 1 transmits the print data packet with the sequence number 2 to the multicast address and the printers A and D promptly send an ACK signal back to the host computer 1. However, although the printer E received the packet with the sequence number two (S41:YES), it detected that the received packet was defective for some reason (S42:NO) and so sent a RESEND request to the host computer 1, asking the host computer 1 to again send the packet (S43).

When the host computer 1 receives a request to resend (S23:YES), then it retransmits the packet with the present sequence number (S21) and receives response packets from the printers (S22). When the printer or printers that requested the retransmission receive the retransmission of the packet (S41:YES), they determine whether or not the packet is normal (S42). If so (S42:YES), then the above-described processes for processing the packet are performed (S44 to S48). In the example of FIG. 6 (c), the host computer 1 again multicast transmits the packet with the sequence number of two and the printer E sends an ACK signal to the host computer 1 upon proper reception of the packet. It should be noted that the printers A and D have already sent ACK signals to the host computer 1, acknowledging receipt of the packet with sequence number 2, and already incremented their registers seqp to the value 3 accordingly. Therefore, the printers A and D will judge that the sequence number of the retransmitted packet (2) is higher than the value in the sequence register seqp (3) (S44:YES) and will ignore the retransmitted packets.

In this way, when a printer receives a packet that is defective, it sends a request to the host computer 1, asking the host computer 1 to retransmit the packet. With this configuration, transmission between the host computer 1 and the printers can also be reliably performed.

Even if a packet that a printer receives is normal, the printer may take time to process the packet because of some reason, such as there is no empty buffer or there is a paper jam at the printer. In this case, the printer can transmit a WAIT request to the host computer 1, indicating a desire for the host computer 1 to wait before sending the next packet.

Further, when some problem occurs on the network, there is the possibility that packets will disappear. If data is damaged, then either all or some of the print data transmitted from the host computer 1 will not be properly received by the printers, or all or some of the acknowledgement responses transmitted from the printers will not be properly received by the host computer 1. For this reason, the host computer 1 will perform retransmission processes, not only when it receives a resend request from a printer, but also a predetermined number of times when it does not receive an acknowledgement response from all of the printers during the time T1.

That is, if the host computer 1 transmits a packet with a certain sequence number to the multicast address (S21) and receives an acknowledgement response from all but one printer (S24:NO), then host computer 1 waits for acknowledgement responses (S22, S24) until the fixed time T1 elapses (S25, S26:NO). If not all network printers return acknowledgement response (S24:NO) by the time that time T1 elapses (S26:YES), then the host computer 1 retransmits the packet with the present sequence number to the multicast address (S21).

In the example represented in FIG. 6 (d), the host computer 1 transmits the packet with the sequence number 3 and, as a result, the printers D and E response with an ACK signal, but the printer A does not respond at all. Here, the host computer 1 waits for a fixed waiting time T1 of five seconds for a response from the printer A. As shown in FIG. 6 (e), after the fixed waiting time T1 elapses, then the host computer 1 retransmits the packet with the sequence number 3 to the multicast address. In this example, the problem with transmission on the network was resolved during the five second waiting time, so the host computer 1 received an ACK signal from the printer A. It should be noted that because the printers D and E have already sent ACK signals to the host computer 1, and have updated the value in their sequence registers seqp to 4 accordingly, the printer D and E will judge that the sequence number of the retransmitted packet is smaller than the value of the sequence register seqp (S44:YES) and ignore the retransmitted packet with sequence number 3.

The action taken by the host computer 1 when the problem with network transmission is not resolved is selected using the selection screen 20, even in the case when the host computer 1 retransmits each time the fixed time T1 elapses. When the first mode is selected, the host computer 1 retransmits each time the fixed time T1 elapses and waits for the problem to be resolved, that is, continues retransmission until the host computer 1 receives an ACK signal from all of the subject network printers. However, the second mode is selected in this example, so the host computer 1 continues printing processes when it does not receive an ACK response from all of the subject printers by the time the set time T2 has elapsed.

That is, when a packet is transmitted (S21), a timer for measuring the fixed time T1 and a timer for measuring the fixed time T1 are both started simultaneously with transmission of the packet. The packet is retransmitted (S21) every time the fixed time T1 elapses (S26:YES). If an ACK signal is not received from all the printers by the time the time T2 elapses (S25:YES), then the host computer transmits the packet with the next sequence number (S20, S21). In the example shown in FIGS. 7 (*a*), 7 (*b*), and 7 (*c*), the host computer 1 first transmits the packet with the sequence number 4 to the multicast address. The printers D and E return an ACK signal in response, but printer A does not respond at all. The host computer 1 waits for the fixed time T1 of five seconds. After five seconds elapses, the host computer retransmits the packet with the sequence number 4 to the multicast address and waits for another five seconds. Again, the printer A does not response with an ACK signal. Because the fixed time T2 will elapse at the same time as this second run of the fixed time T1, the host computer 1 stops waiting for a response from the printer A and transits the packet with the sequence number 5. Because the host compute 1 has given up on the printer A, the host computer 1 will judge that ACK signals have been received from all of the subject printers when it receives ACK signals from the printers D and E, and therefore will continue packet transmission processes.

If the problem is resolved so that the printer A can properly receive packets transmitted to the multicast address, the printer A will judge that the sequence number 5 of the next received packet is larger than the sequence number 3 of the packet received when the problem first occurred (S45:YES). As a result, the printer A terminates printing operations and leaves the multicast group (S46). When a printer leaves a multicast group, it sets its settings so that it is incapable of transmitting packets to and receiving packets from the multicast address associated with the multicast group.

When the host computer 1 performs packet transmission processes in the above-described manner until all print packets are transmitted (S18:YES), the host computer 1 sends a leave packet to the multicast address (S19). The leave packet includes a command indicating that the printers should leave the multicast address. When the printers D and E receive the leave packet (S49:YES), then the printers D and E leave the multicast group and send an ACK signal to the host computer, acknowledging receipt of the leave packet from the host computer 1 (S50).

After transmitting the leave packet, the host computer 1 judges whether it receives an ACK signal from all of the printers (S27). When the host computer 1 receives an ACK signal from all of the printers (S27:YES), then transmission processes for this set of print data are ended (S28). However, if the host computer 1 does not receive an ACK signal from all of the printers (S27:NO), then the host computer 1 resends the leave packet (S19). It should be noted that restrictions could be set for the number of times that the leave packet is resent and for the inter-transmission time between retransmissions. Also, if an ACK signal is not received from one or more of the printers by the time a certain time period has elapsed, then processes can be temporarily stopped. After a fairly long time elapses, then retransmission of the leave packet can be restarted again.

In the example of FIG. 7 (*d*), the host computer 1 unicast transmits a leave request (leaveGroup) to the printers that it previously sent a joining request (joinGroup) to. The printers that receive the leave request perform processes to remove themselves from the multicast group. This prevents potential problems in the functioning of the network that could be caused by a printer continuing on as a member of the multicast group. It also enables the printers to dynamically react to join requests from the host computer 1.

Because print data is transmitted using multicast, a plurality of copies can be quickly printed without burdening other printers connected to the network.

Next, a modification of the embodiment will be described. FIG. 13 shows a screen displayed on the cathode ray tube (CRT) or other display device of the host computer 1 when the host computer according to the modification is executing a print job. The screen is used to set the number of times a print job is to be retransmitted and the timing of the retransmissions. In the example shown in FIG. 13, the user has input that three retransmissions are to be performed, and has input a first retransmission time of 3 hours and 30 minutes, a second retransmission time of 4 hours, and a third retransmission time of 24 hours. The retransmission times indicate how long the host computer 1 is to wait after a problem occurs before retransmitting data. That is, in this example the host computer 1 is to wait 3 hours and 30 minutes after a problem occurs before making the first retransmission, four hours before making the second retransmission, and 24 hours before making the third retransmission. In this way, various settings, such as the number of retransmissions, can be designated according to the will of the user. It should be noted that default values can be automatically set.

Figure 14A:
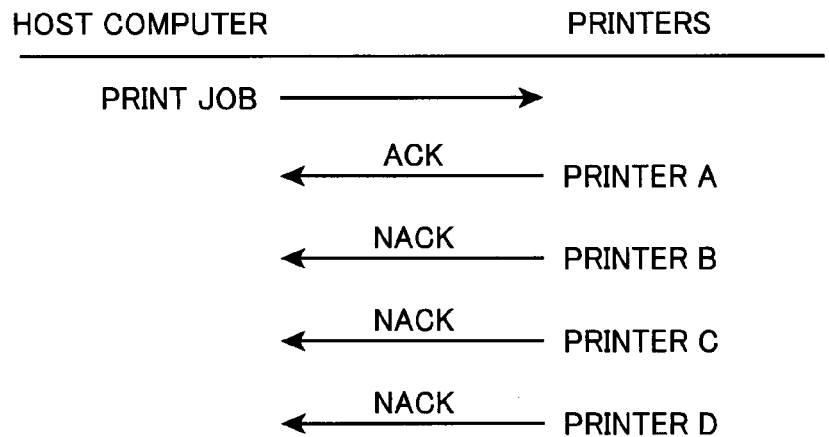
FIG. 14(a) is a schematic view showing the host computer transmitting a print job to a multicast address, and consequently to a plurality of the network printers, and receiving acknowledgement of receipt from only one of the network printers.
Figure 14B:
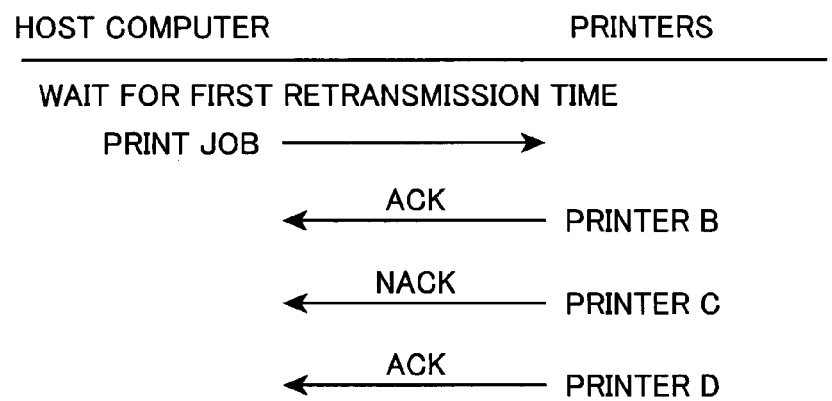
FIG. 14(b) is a schematic view showing the host computer retransmitting the print job to the multicast address after a first transmission time and receiving acknowledgement of receipt from all but one of the remaining network printers.
Figure 14C:
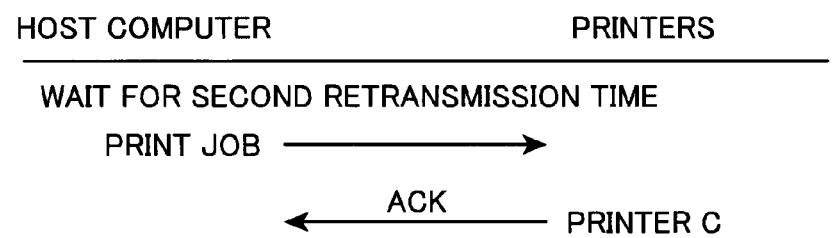
FIG. 14(c) is a schematic view showing the host computer retransmitting the print job to the multicast address after a second transmission time and the final printer acknowledging receipt.
Figure 15A:
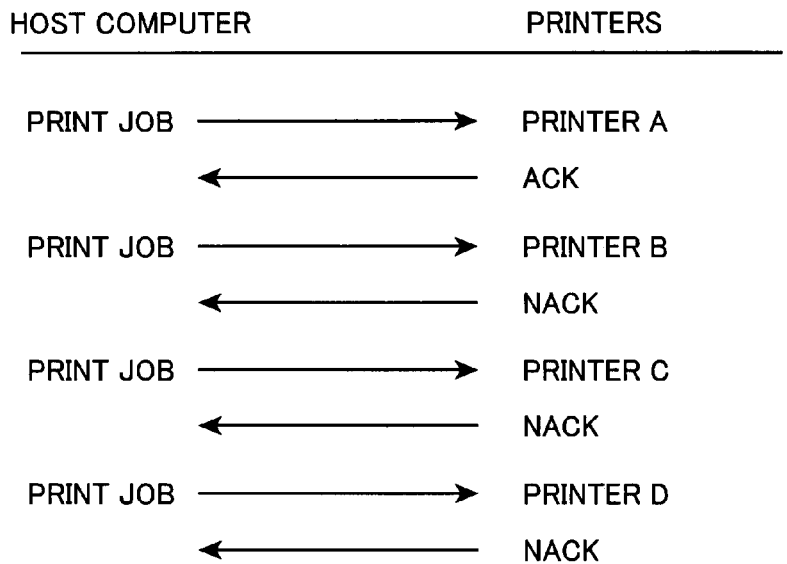
FIG. 15(a) is a schematic view showing the host computer unicasting a print job to the printers and receiving acknowledgement of receipt from only one printer.
Figure 15B:
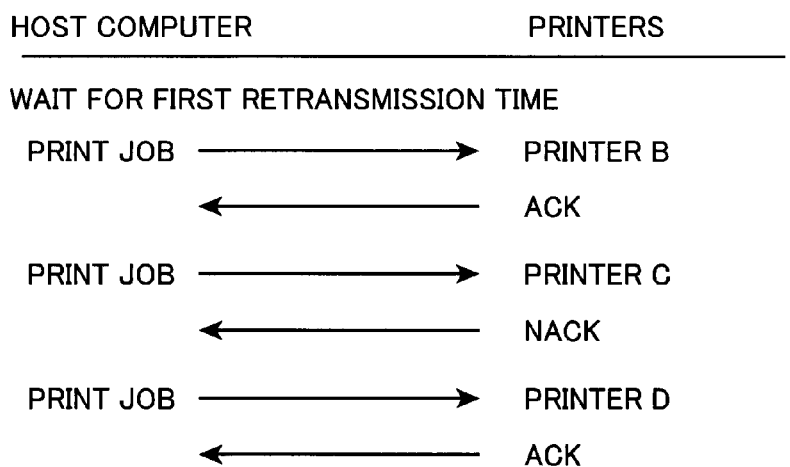
FIG. 15(b) is a schematic view showing the host computer again unicasting the print job after a first transmission time to the printers that did not acknowledge receipt of the first transmission and all but one printer responding with acknowledgement of receipt.
Figure 15C:
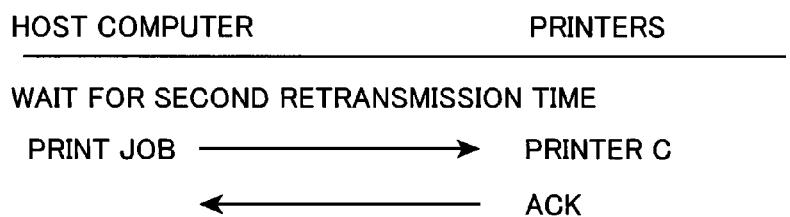
FIG. 15(c) is a schematic view showing the host computer again unicasting the print job after a second transmission time and the final printer acknowledging receipt.

Next, processes performed by the printing system of the embodiment will be explained while referring to FIGS. 14 (*a*) to 14 (*c*). As shown in FIG. 14 (*a*), the host computer 1 multicast transmits a print job to the predetermined multicast address. The printers A, B, C, and D are members of the multicast address and so receive the print job. The network printers that can print out the received print job send an ACK response to the host computer 1. Those network printers that cannot print out the received print job send a NACK response to the host computer 1. In the example shown in FIG. 3, the network printer A sends an ACK response to the host computer 1. However, the other network computers B, C, and D are unable to execute printing processes because of some sort of problem, and so send a NACK response to the host computer 1. Once the network printer A completes the print job, it leaves the multicast group of the predetermined multicast address.

The host computer 1 enters a waiting condition until the first retransmission time, that is, three hours and thirty minutes in this example, elapses. As shown in FIG. 14 (*b*), when the first retransmission time elapses, then the host computer 1 multicast transmits the same print job to the predetermined multicast address in the same manner as indicated in FIG. 4 (*a*). In the example shown in FIG. 14 (*b*), the network printers B and D send ACK responses to the host computer 1, but the network printer C again sends a NACK response to the host computer 1. When the network printers B and D complete printing processes, they leave the multicast group.

The host computer 1 then enters a waiting condition for the second retransmission time of four hours shown in FIG. 13 to elapse. As shown in FIG. 14 (*c*), once the second retransmission time has elapsed, then the host printer again multicast transmits the same print job to the predetermined multicast address in the manner as shown in FIG. 14 (*a*). In the example shown in FIG. 14 (*c*), the network printer C sends an ACK response to the host computer 1. Once the network printer C completes the printing processes for the print job, it leaves the predetermined multicast group.

In this way, the print job is resent to printers that for whatever reason, such as a paper jam, running out of paper, running out of toner, and the like, have not completed the print job after the one or more waiting times elapse. Therefore, there is a higher probability that the processes for the print job will be completed. Because retransmission is performed using multicast, print jobs can be completed by those network printers of the multicast address that were originally scheduled to perform the printing processes. The desire of the user that operates the host computer 1 can be satisfied.

Although the modification describes retransmitting all of print jobs that were not completely printed, only the portion of the print job that was not completed need be retransmitted. In this way, printed documents that correspond to a portion of the print job can be effectively utilized. In both cases, it is desirable to print a printing guide page that indicates that the documents printed after the guide page are a replacement or supplementary printing of incompletely printed documents. Because the remainder of the print job is printed after a waiting time, there is a danger that another user might through away the remainder of the print job, against the wishes of the user.

Although the modification describes the host computer 1 as transmitting the print job to the multicast address, the host computer 1 can store distinction information, such as address information of the network printers, printers' names, and other information for distinguishing which network printers have had problems and, as shown in FIGS. 16 (*a*) to 16 (*c*), only unicast retransmit print jobs to those network printers that have had problems and so were unable to receive the print job previously, based on the stored distinction information. All portions of a print job not completed before the trouble occurred can be printed with the same font and the like as portion completed before the trouble occurred.

While the invention has been described in detail with reference to specific embodiments thereof, it would be apparent to those skilled in the art that various changes and modifications may be made therein without departing from the spirit of the invention, the scope of which is defined by the attached claims.

For example, although the embodiment described transmission and reception of packets between devices that is, the host computer 1 and printers A to H, across the same network 2, the multicast router 3 can be used to transmit packets from devices connected to the network 2 to devices of another network (not shown) also connected to the multicast router 3.

Also, although the embodiment describes the printers as joining the multicast group according to the command from the host computer, the printers can join the multicast group on their own accord. For example, the printer can be produced with a particular multicast address predefined as a printing multicast address. That is, the particular multicast address can be stored in the ROM of the printer so that each time during initialization the particular multicast address is set as the print multicast address. In this case, the printer will always be a member of the multicast group associated with the particular multicast address and so will always be capable of performing multicast printing operations. There is no need to transmit the joinGroup and leaveGroup commands from the host computer. As an alternative to the printer joining the multicast group during initialization, the printer can be designed so that when a key or group of keys of its control panel is operated, the printer joins the multicast group.

Although the modification describes retransmitting a print job several times at several different inter-transmission waiting times, a print job can be resent once only or several times after a fixed inter-transmission waiting.

What is claimed is:

1. A printer control device, comprising:
   a joining unit that causes at least one network printer to join a predetermined multicast address;
   a transmission unit that converts print data into packets and multicast transmits the packets to the predetermined multicast address; and
   a control unit that monitors transmission/reception status of the packets at the at least one network printer that has joined the multicast address and that, based on monitoring results, controls transmission of packets to, waiting for packets from, and retransmission of packets to the predetermined multicast address.

2. A printer control device as claimed in claim 1, further including a detection unit that detects network printers that are capable of joining a multicast address.

3. A printer control device as claimed in claim 2, further comprising a network printer selection unit capable of selecting at least one network printer to use in actual printing from the network printers detected by the detection unit.

4. A printer control device as claimed in claim 3, further comprising a print copy number setting unit that sets a number of copies to be printed by each of the at least one network printer selected by the network printer selection unit.

5. A printer control device as claimed in claim 1, further comprising an operation procedure unit that presets transmission operations, waiting operations, and retransmission operations of the control unit with regard to the predetermined multicast address to depend on packet reception/transmission status at the at least one network printer that joined the predetermined multicast address.

6. A printer control device as claimed in claim 1, further comprising a retransmission unit that retransmits the same packet to the predetermined multicast address when the control unit does not receive within a certain duration of time an acknowledgement response, which indicates reception of the packet transmitted from the transmission unit, from all network printers that have joined the multicast address.

7. A printer control device as claimed in claim 6, wherein the control unit does not receive acknowledgement responses because of transmission problem that occurred on the network.

8. A printer control device as claimed in claim 1, wherein the transmission unit transmits a subsequent packet to the multicast address when the control unit does not receive within a certain duration of time an acknowledgement response, which indicates reception of the packet transmitted from the transmission unit, from any one of the network printers that have joined the multicast address.

9. A printer control device as claimed in claim 1, further comprising:
   a printing completion judgment unit that judges whether, after a certain duration of time elapses from when the transmission unit transmits the print data, the network printer has completely printed out the print data transmitted by the transmission unit; and
   a retransmission unit that, when the printing completion judgment unit judges that the network printer has not completely printed out the print data, retransmits print data transmitted by the transmission unit.

10. A printing control unit as claimed in claim 9, wherein the retransmission unit retransmits all of the print data transmitted by the transmission unit.

11. A printing control unit as claimed in claim 10, further comprising a print starting unit that controls the network printer to print out a message indicating that following printing is a replacement printing, before controlling the network printer to print the incompletely printed print data from the last incompletely printed page.

12. A printing control unit as claimed in claim 9, wherein the retransmission unit retransmits only incompletely printed portions of the print data transmitted by the transmission unit.

13. A printing control unit as claimed in claim 12, further comprising a print starting unit that controls the network printer to print out a message indicating that following printing is a supplementary printing, before controlling the network printer to print the incompletely printed print data from the last incompletely printed page.

14. A printing control unit as claimed in claim 9, wherein the retransmission unit retransmits the print data to the multicast address in order to multicast transmit the print data to any network printer that did not complete printing of print data transmitted from the transmission unit.

15. A printing control unit as claimed in claim 9, wherein the retransmission unit retransmits the print data a single time.

16. A printing control unit as claimed in claim 9, wherein the retransmission unit retransmits the print data a plurality of times.

17. A printing control unit as claimed in claim 16, wherein the transmission unit retransmits the print data repeatedly each time a fixed period of time elapses.

18. A printing control unit as claimed in claim 16, wherein the transmission unit retransmits the print data repeatedly at a changeable timing.

19. A printing control unit as claimed in claim 18, further comprising a selection unit enabling a user to select number of retransmission times and an inter-retransmission time duration of retransmission performed by the retransmission unit.

20. A network printer comprising:
a network interface connected to a network;
a multicast joining unit that joins a multicast address, the multicast address associating a plurality of network printers into a multicast group, wherein print data transmitted to the multicast address is transmitted to all network printers that belong to the multicast group associated with the multicast address; and
a refusing unit that, when the network printer is already a member of a multicast address, refuses a command from a printing control device for joining another multicast address,
wherein the network printer receives print data to be printed via the multicast address.

21. A print control method comprising:
causing at least one network printer to join a multicast address;
transmitting a packet of print data to the multicast address;
monitoring transmission/reception status of packets at the at least one network printer that joined the multicast address; and
controlling transmission of packets, waiting for packets, and retransmission of packets with respect to the multicast address according to monitoring results.

22. A printing control method as claim in claim 21, further comprising:
retransmitting the print data when the print data is not completely printed after a time period elapses after transmitting the packet of print data.

23. A printing control method as claimed in claim 22, wherein all of the print data is retransmitted.

24. A printing control method as claimed in claim 22, wherein only incompletely printed portions of the print data are retransmitted.

25. A printing control method as claimed in claim 22, wherein the print data is retransmitted a single time.

26. A printing control method as claimed in claim 22, wherein the print data is retransmitted a plurality of times.

27. A printing control method as claimed in claim 26, wherein the print data is retransmitted repeatedly at a fixed timing.

28. A printing control method as claimed in claim 26, wherein the print data is retransmitted repeatedly at a changeable timing.

29. A printing control method as claimed in claim 22 wherein the step of retransmitting the print data includes retransmitting the print data to the multicast address in order to multicast transmit the print data to any network printer that did not completely print out transmitted print data.

30. A printer system, comprising:
a printer control device; and
a network printer,
wherein the printer control device comprises:
a joining unit that causes at least one network printer to join a predetermined multicast address;
a transmission unit that converts print data into packets and multicast transmits the packets to the predetermined address; and
a control unit that monitors transmission/reception status of the packets at the at least one network printer that has joined the multicast address and that, based on monitoring results, controls transmission of packets to, waiting for packets from, and retransmission of packets to the predetermined multicast address,
wherein the network printer comprises:
a network interface connected to a network; and
a multicast joining unit that joins the predetermined multicast address.

31. A printer system as claimed in claim 30, wherein the network multicast joining unit joins the multicast address on its own accord.

32. A printer system as claimed in claim 30, wherein the network multicast joining unit joins the multicast address by a command from a printing control device connected to the network.

33. A printer system as claimed in claim 32, further comprising a refusing unit that refuses the command from the printing control device when already a member of another multicast address.

34. A printer system as claimed in claim 32, further comprising a response unit that sends the printing control device an acknowledgement response indicating that a packet of print data was received from the printing control device, a negative acknowledgement response indicating that the packet was not received from the printing control device, or a retransmit response requesting the printing control device to retransmit the packet.

35. A printer system as claimed in claim 30, further comprising a leave unit for leaving the multicast address.

* * * * *